United States Patent [19]

Pingel et al.

[11] 4,250,921

[45] Feb. 17, 1981

[54] RESERVE METERING VALVE

[76] Inventors: Wayne H. Pingel; Donna M. Pingel, both of Rte. #1 Box 171, Grand Marsh, Wis. 53936

[21] Appl. No.: 32,076

[22] Filed: Apr. 23, 1979

Related U.S. Application Data

[62] Division of Ser. No. 904,666, May 10, 1978, abandoned.

[51] Int. Cl.$^3$ .................................. F16K 11/083
[52] U.S. Cl. ............................ 137/625.41; 137/590
[58] Field of Search ............. 137/625.41, 590, 625.32

[56] References Cited

U.S. PATENT DOCUMENTS

| 1,521,817 | 1/1925 | Jerdone, Jr. | 137/590 |
| 1,605,619 | 11/1926 | Schreiner | 137/590 |
| 3,137,314 | 6/1964 | Woodhall | 137/625.41 X |

Primary Examiner—Arnold Rosenthal
Attorney, Agent, or Firm—Bianchi & White

[57] ABSTRACT

A valve is provided having multiple vertically spaced inlet ports, and having a port selection mechanism for connecting to the outlet selected inlets corresponding to predetermined reserve levels.

1 Claim, 11 Drawing Figures

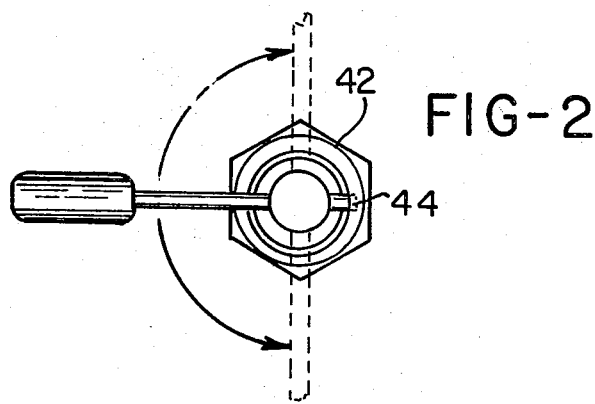
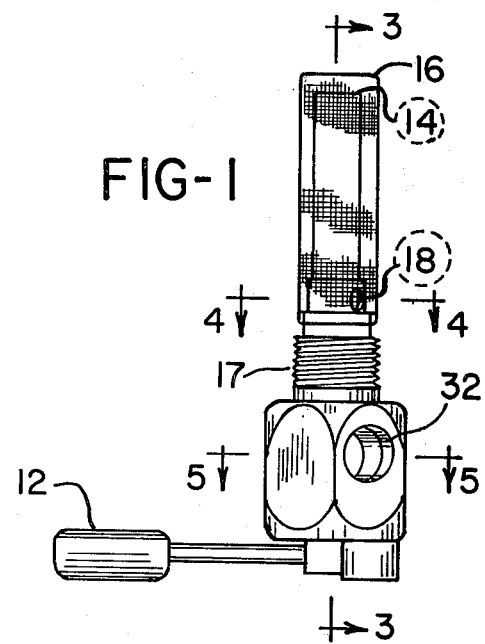
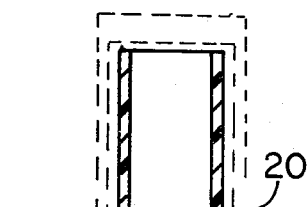
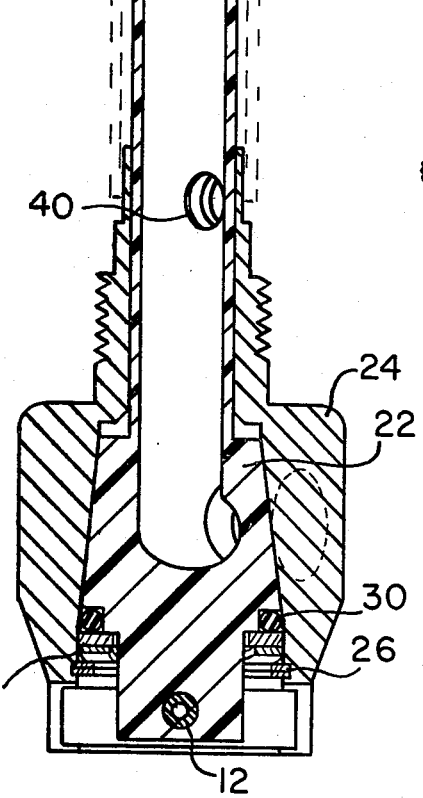
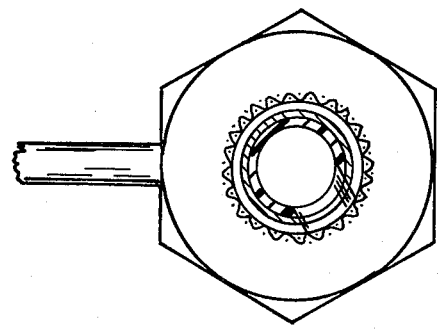
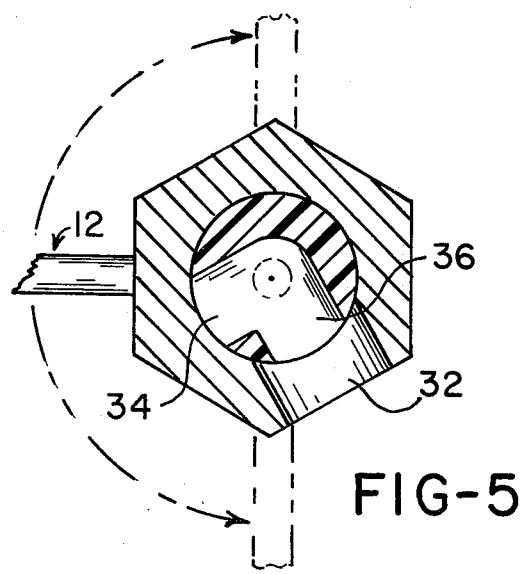

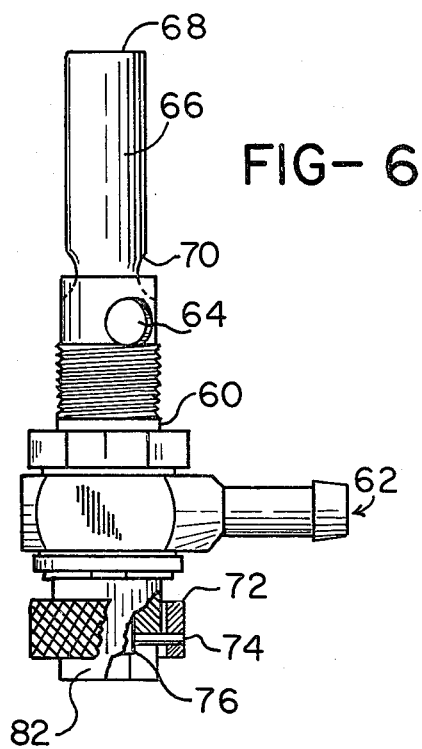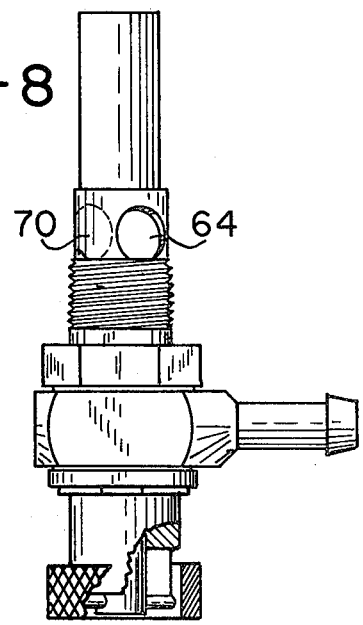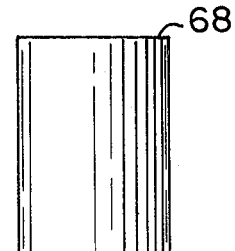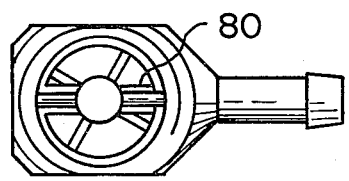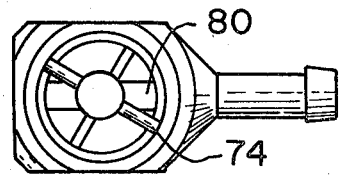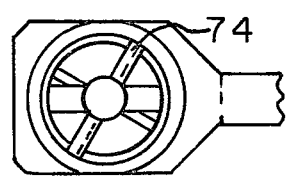

RESERVE METERING VALVE

This is a division of application Ser. No. 904,666 filed May 10, 1978, now abandoned.

BACKGROUND OF THE INVENTION

This invention relates generally to fuel line reserve and shut off valves and more particularly concerns gravity feed reserve metering valves. Prior valves have attempted to provide reserve metering capability by providing resetable mechanisms and linkages which detect fluid level and shut off fuel flow. Vacuum feed systems have attempted to interrupt fuel flow by breaking the vacuum seal in correspondence to predetermined levels of fuel. These prior approaches have generally been bulky, complicated, and generally inapplicable to motorcycle applications where miniature size, simplicity, and extreme reliability are demanded. Further, in motorcycle applications it is highly important that a complete fuel line shut off be easily accessable and quickly operable.

SUMMARY OF THE INVENTION

In the present invention there are provided embodiments of a shut off and reserve valve which display characteristics of both small size and simplicity. It supplies reserve metering capability through a simplified multiple inlet system in conjunction with an inlet port selector mechanism. It is therefore, an object of the present invention to provide a valve for a motorcycle fuel line which may be operated quickly and which provides both a reserve metering capability and an absolute fuel line shut off. It is a further object to provide a reliable valve apparatus which involves a minimum of components and is accordingly economical to manufacture. Other objects and advantages of the invention will become apparent upon reading the following detailed description and appended claims, and upon reference to the accompanying drawings.

BRIEF DESCRIPTION OF THE DRAWINGS

For a more complete understanding of this invention reference should now be had to the embodiments illustrated in greater detail in the accompanying drawings and described below by way of examples of the invention.

In the drawings:

FIG. 1 is a front elevation pictoral view of the preferred embodiment of the present invention.

FIG. 2 is a bottom view of the valve of FIG. 1;

FIG. 3 is a cross sectional view of the valve of FIG. 1 taken along lines 3—3;

FIG. 4 is a cross sectional view of the valve of FIG. 1 taken along lines 4—4;

FIG. 5 is a cross sectional view of the valve of FIG. 1 taken along lines 5—5;

FIG. 6 is a pictoral front elevational view of a second embodiment of the present invention as shown in an "OFF" position;

FIG. 7 is a bottom of the valve of FIG. 6;

FIG. 8 is a front elevational view of the valve of FIG. 6 shown in it's "ON" position;

FIG. 9 is a bottom view of the valve of FIG. 8;

FIG. 10 is a partially cut-away view of the valve of FIG. 6 and FIG. 8 shown in it's "RESERVE" position.

While the invention will be described in connection with the preferred embodiment, it will be understood that we do not intend to limit the invention to that embodiment. On the contrary, we intend to cover all alternatives, modifications and equivalents as may be included within the spirit and scope of the invention as defined by the appended claims.

DESCRIPTION OF THE PREFERRED EMBODIMENTS

Turning first to FIG. 1, there is shown a preferred embodiment of the present invention having at it's lower extremity a lever 12 for operating the valve and at it's upper extremity it's normal inlet port 14 covered by a fuel filter screen 16. Below the normal inlet 14 there is a reserve inlet 18 again located under the fuel filter screen. These inlets provide access to an internal passage 20 of the valve selection member 22 fitted within casing 24. The contacting surfaces therebetween are smoothed to provide a sealing effect. Holding port selection member 22 in place is retaining ring 26 and spring washer 28, the retaining ring fitting into a complimentary groove of the casing. To provide an external seal there is located between the retaining assembly, the port selection member, and the casing, an O-Ring compression seal 30. This valve is arranged for mounting within a fuel tank by thread means 17 by gravity feed.

Selection of inlets is accomplished by a valve selection member rotated by control handle 12 within the casing chamber. This chamber has an outlet port 32 formed in it's side for coupling to an external fuel line. Upon rotation of the valve's selection member one of the two lower legs of the passage 34 and 36 will be aligned with the outlet port in the casing (see FIG. 5). In normal operation leg 34 of chamber 20 would be aligned with outlet port 32 and fuel would flow from a tank through screen 16 and inlet 14 into passage 20. Flow would proceed uninterrupted through chamber 20 and out leg 34 to an external coupling. When the fuel level in the tank drops below the normal inlet port 14, flow would be interrupted until the operator moves control arm 12 to the reserve position shown in FIG. 5. In this reserve position secondary inlet port 18 in the valve casing becomes aligned with the internal opening 40 to the passageway of the valve selection member 22. Flow will begin again through openings 18 and 40 and exiting the valve through leg 36 of the passage.

In a further aspect of the preferred embodiment there is provided a lower edge 42 on the valve casing (see FIG. 2) to further secure the valve. An extension of the operating lever 44 overlaps with this lower edge and will catch upon this ledge in the event there is a failure of retaining ring 26. This prevents complete failure of the valve and eliminates the risk of serious fuel spillage.

Reference now being made to FIGS. 6 through 11 there is shown an alternative embodiment of the present invention with a spring biased port selection mechanism. In this embodiment there is provided a casing 60 having formed thereon an outlet coupling 62 and reserve inlet 64. Within the casing there is provided a port selection member 66 having a normal inlet port 68 and reserve inlet ports 70. This selection member is controlled by an attached dial 72 and it's lower extremity arranged to position the port selection member in any one of three basic positions, that is, "OFF", "ON" and "RESERVE". For this selection there is provided a cross arm 74 mounted on the dial and attached to support shaft 76. The cross arm and support shaft are arranged for reciprocal motion within slot 80 in the valve casing 82. In the "OFF" position the dial and cross arm are shifted to the upper portion of the slot 80 and biased in that position by coil spring 84. This spring is mounted on the support shaft between the valve selection member shoulder 86 and the lower extremity of the valve casing 88. Communication between inlet and outlet is accomplished when the valve seat O-Ring seal 90 is displaced below the valve seat 92. This allows fluid flow from the valve outlet 94 through corresponding openings in the valve casing 96.

When the dial operating lever is rotated to the "OFF" position shown in FIG. 7, the spring 84 is allowed to fully extend and force the O-Ring sealing gasket against the seat 92, shutting off fluid flow. When the port selection member is shifted downward and rotated slightly clockwise as shown in FIG. 9, the transverse bar 74 will rest upon the lower edge of the valve casing 100 and the valve will be set for normal flow. In such position the reserve inlet 64 in the valve casing will not be aligned with the inlets 70 of the port selection member. A partial seal is obtained where the port selection member is provided with a smooth external surface for engagement with a complimentary smooth surface on the inner side of the valve casing. Further clockwise rotation to a second position shown in FIG. 11 will align inlet ports 70 and 64 and allow fuel to enter the internal passageway from the second tank level.

In operation this valve would be affixed to the bottom of a fuel tank by thread attachment 102 and switched to the "ON" position as shown in FIGS. 8 and 9 for normal operation of the fuel line. When the fuel level in the fuel tank drops below inlet 68 the flow will become interrupted inasmuch as fuel will not be able to enter through inlet 68 nor through inlet 64 until the inlet 70 of the valve selection member is rotated into reserve position in alignment with inlet 64. Upon alignment the fuel line operation is resumed and the distance between inlet 68 and inlet 64 define a predetermined reserve volumn in the fuel tank.

In the event it is desired to turn the fuel line "OFF", a further clockwise turn will align the mounting cross bar 74 with the slot 80 of the valve casing. By spring action the selection member will shift upward and engage the sealing gasket 90 against the valve seat 92 to stop the flow.

In summary there has been described herein an improved reserve valve which provides reserve measuring capabilities. Further, this valve provides an uncomplicated assembly of a reciprocal or rotatable selection member which selects inlets at different elevations to distinguish a low fuel level and provide a reserve meter.

We claim:

1. A reserve metering valve comprising:
   a hollowed support casing having formed thereon an inlet extension, said inlet extension having a plurality of spaced inlet ports defined along the length thereof, and wherein one of said inlet ports is axially aligned with said inlet extension and of substantially the same diameter to maximize the flow therethrough, and said support casing further having formed thereon an outlet port oriented to provide flow therethrough in a direction substantially perpendicular to the direction of flow through the said inlet extension; and
   a port selection member arranged in sealing engagement and mounted for selective rotation within said support casing and having a hollowed inlet extension defined thereon extending along the inlet extension of said support casing and having an opening at the extremity thereof coincident with said axially aligned inlet port, said port selection member further comprising a tapered plug portion arranged to sealingly engage the support casing; and
   means for urging the port selection member into sealing engagement with the hollowed support casing.

* * * * *